Patented Sept. 26, 1950

2,523,496

UNITED STATES PATENT OFFICE 2,523,496

METHOD OF PREPARING XANTHINE AND METHYLATED XANTHINES

Kenneth N. Campbell and Barbara K. Campbell, South Bend, Ind.

No Drawing. Application October 21, 1948, Serial No. 55,828

17 Claims. (Cl. 260—252)

This invention relates to a method of making xanthine and methylated xanthines, and relates particularly to a method of making caffeine.

Caffeine is perhaps the most important xanthine derivative. The principal sources of caffeine up to the present time have been natural products such as coffee, cocoa, tea dust and the like, from which the natural caffeine was separated. Although methods of synthesizing caffeine have been proposed, none of these have been entirely satisfactory, principally for economic reasons. In many of these methods the starting materials were uric acid or methyl derivatives thereof and these are compounds somewhat expensive and difficult to obtain. In certain prior methods of synthesizing caffeine, however, it was proposed to use urea or methyl derivatives thereof. In the Traube process (Ber. 33, 3035) the starting materials were dimethylurea and cyanoacetic acid. All of these prior processes, however, of which applicant is familiar, resulted in relatively low yields and were quite lengthy and somewhat expensive. The low yields appeared to be caused in part by the relatively large number of steps involved in the process. Certain of these prior art processes also employed high pressures, high temperatures, or both, and these caused decomposition of the reactants.

In the method of synthesizing caffeine according to this invention, the yield is relatively high and the process is relatively inexpensive and does not require complicated or special equipment. The process has been reduced to a small number of steps and the various steps are all interrelated so that the end product of each step may be used in the next step without requiring special treatment.

One of the features of this invention is to provide an improved process of synthesizing xanthine and methylated xanthines such as caffeine cheaply, efficiently and in a relatively high yield. Another feature of this invention is to provide such a process wherein the reactants are relatively inexpensive readily available materials. Other features and advantages of this invention will become apparent in the following description of the invention.

Although the method of this invention may be used in synthesizing xanthine and methylated xanthines, it will be described in greater detail as related to the preparation of theophylline (1,3-dimethyl xanthine) and caffeine (1,3,7-trimethyl xanthine).

In synthesizing caffeine by the method of this invention the starting materials are cyanoacetic acid and symmetrical dimethylurea. These materials are reacted together preferably in the presence of acetic anhydride to make cyanoacetyl-dimethylurea. The acetic anhydride acts as a solvent and after the reaction is complete the anhydride is removed. After removal of the acetic anhydride the residue is dissolved in water and added to a solution of sodium nitrite and water. This solution is slowly made acid with acetic acid and then cooled. On cooling, rose-colored crystals of an isonitroso compound precipitate out. This isonitroso compound is 1,3-dimethyl-4-imino-violuric acid. This material need not be dried for use in the subsequent step.

The isonitroso compound is reduced to form 1,3-dimethyl-2,6-dioxy-4,5-diaminopyrimidine. This diamine is then converted to the formyl derivative by treatment with formic acid in a solvent. The reaction is brought about by heating the formic acid and the diamine compound together. The formyl derivative (1,3-dimethyl-2,6-dioxy-4-imino-5-formylaminopyrimidine) need not be dried before it is used in the next step, in which it is treated with an alkali metal hydroxide solution to form an imidazole ring connecting the carbon atoms in the 4 and 5 positions. These carbon atoms are joined by a double bond.

The compound resulting from the step described above is theophylline and may then be treated with a methylating agent to introduce a methyl group at the 7-nitrogen atom to form caffeine. This caffeine may be precipitated out by adding an acid to the solution. It is preferred that a weak acid, such as acetic acid, be employed in order that salts will not be formed. This caffeine precipitate is then separated from the solution and dried. The product was found to have a melting point of about 230° C.

The reactions which are used in preparing caffeine by the above method are summarized as follows:

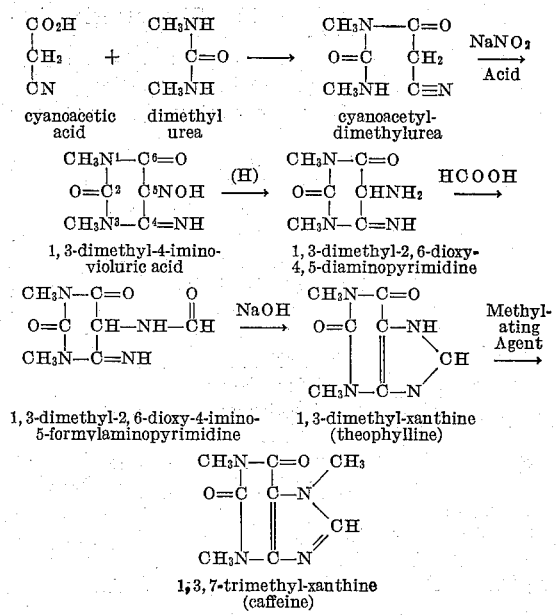

It should be noted from the above reactions that the same process can be used for making theophylline (1,3-dimethyl-xanthine) as this compound is formed as an intermediate in the penultimate step in the process. The theophylline is methylated at the nitrogen atom in the 7-position to make caffeine.

The process with only slight modification can be used for preparing theobromine (3,7-dimethyl-xanthine) or any other methylated xanthine or xanthine itself. Thus if urea is used as the starting material instead of a methylated urea, the end product can be xanthine. Where methylated xanthines such as caffeine, theophylline, theobromine and the like are to be prepared, the methyl group or groups on the 1- or 3-nitrogen atoms, or both, should be introduced before the cyanoacetyl-urea compound is treated with the alkali metal nitrite and acid to close the first ring as they are easier to introduce at this point and the ultimate yield is greater.

One of the great advantages of the present process is that the intermediate compounds in each step need not be dried, or similarly treated, before being used in the next step. This reduces losses, thereby increasing the yield and also saves time and labor.

The presence of methyl groups in the diamine in the 1- or 3-positions, or both, has been found to be of great importance as the methyl group or groups have a stabilizing effect on the diamine so as to reduce decomposition of the diamine and thus increase the yield. The methyl group or groups also causes the imidazole ring to close more easily and this also makes the process easier and increases the yield.

In reacting the cyanoacetic acid and symmetrical dimethylurea in the caffeine process, it is preferred that the reactants be heated to from about 60 to 125° C., preferably about 95 to 125° C. This heating may be conveniently done on a steam bath. When dimethylurea is employed as one of the reactants the cyanoacetic acid and the dimethylurea are preferably used in about equimolar quantities. As in the reaction illustrated by the above equation, one mol of the acid reacts with one mol of the urea derivative. These relative amounts may, of course, be varied without affecting the process. In actual practice it is preferred that about 300 to 700 parts by weight of dimethylurea be used for each 500 parts by weight of cyanoacetic acid. The reaction between the acid and the urea derivative will ordinarily require about one hour when the materials are heated on the steam bath. The time may be increased, however, to three or four hours or more.

Although dimethylurea is preferred as the urea derivative it is possible to use any methylated urea so long as it has not more than two methyl groups and not more than one methyl group attached to a single nitrogen atom. If monomethylurea is employed one of the intermediate materials may be further methylated to introduce the required additional methyl group for making caffeine. If desired this further methylation may occur in the last step of the process.

In preparing the isonitroso compound either sodium or potassium nitrite or any other alkali metal nitrite may be used. The alkali metal nitrite is preferably added in water solution in an amount of about one mol. After the reaction with the sodium nitrite the solution is acidified preferably with acetic acid in order to precipitate out the isonitroso compound. Any other acid may be used if desired but it is preferred that a weak acid, such as phosphoric or acetic, be used in order to prevent the formation of salts.

In reducing the isonitroso compound to the dimethyldioxy-diaminopyrimidine any of the commonly used reducing agents may be employed. Good results have been achieved by using either ammonium sulfide or by using a dilute aqueous ammonia solution in the presence of an activated nickel catalyst, such as Raney nickel catalyst, and hydrogen. When ammonium sulfide is employed the sulfide is used in the form of a solution and the isonitroso compound is mixed with this solution. After mixing, more ammonium sulfide is added with the temperature being kept below about 75° C. This temperature may be as low as about 40° C. After the reaction is complete the solution may be cooled and this causes the diamine to separate out. After the diamine is filtered from the solution, it is washed with water and is then ready for the next step of the reaction and need not be dried. When the activated nickel catalyst is used as a reducing agent it is preferably employed with the dilute aqueous ammonia as the ammonia assists the reaction. If desired, however, the nickel catalyst may be used with alcohol, water, mixtures thereof, or other solvents.

In preparing the diamine compound it is preferred that catalytic reduction be employed. The catalytic reduction is of particular advantage as it avoids the introduction of impurities, which are difficult to remove, and avoids the production of inorganic salts. Furthermore, the process is much simpler and higher yields are achieved when catalytic reduction is employed. The preferred catalyst is activated nickel although others, such as platinum, palladium, copper-chromium, and the like may be used.

In treating the diamine with formic acid to produce the formyl derivative it is preferred that about an 87% formic acid solution be employed. The solvent which is used may be water, alcohol, or any other solvent. In practicing the invention it has been found that alcohols, such as isopropanol, are excellent solvents as they are relatively inexpensive and produce good results. Although an 87% solution of formic acid is preferred as the solvent, practically any reasonable strength solution may be employed if desired. Thus the formic acid may be present in an amount from about 50% up to as concentrated a solution as possible.

In treating the formyl derivative to produce the imidazole ring, a strong soluble base such as an alkali metal base is employed. This base is preferably sodium hydroxide although any alkali metal hydroxide such as potassium hydroxide may be employed. When the base is sodium hydroxide a 2 N. solution is preferably used. In one example, 30 cc. of the sodium hydroxide solution was used for each 10 grams of the formyl derivative. This derivative was suspended in the sodium hydroxide solution and the mixture was heated on the steam bath for about 10 minutes. During this time the derivative first dissolved and then a new solid was formed. The mixture containing this solid was cooled and then treated with dimethyl sulfate as the methylating agent. The mixture was warmed to about 60° C. for a few minutes for the reaction to go to completion. The dimethyl sulfate caused a methyl group to be introduced on the 7-nitrogen atom to form caffeine. This caffeine, which was in solution, was precipitated by acidifying the solution. The preferred acid for this step is acetic acid. It is believed obvious that any ordinary methylating agent could be employed for the methylating step. In precipitating the caffeine from solution the acetic acid was added and the mixture heated to from 50 to 100° C., or preferably about 60° C., until precipitation was complete.

It is believed obvious from the above description that solvents, reducing agents, methylating agents and the like may be varied without departing from the invention. The choice of any of these materials and the particular conditions under which the reactions are carried on are well within the knowledge of those skilled in the art.

In one example of practicing this invention for making theophylline or caffeine equimolar quantities of cyanoacetic acid and symmetrical dimethylurea were reacted in the presence of acetic anhydride on the steam bath for one hour. At the end of this time the acetic anhydride solution was removed and the residue was taken up in water and added to a water solution containing about one mol of sodium nitrite dissolved therein. This solution was slowly acidified with acetic acid and then cooled. On cooling rose-colored crystals of 1,3-dimethyl-4-imino-violuric acid separated. This isonitroso compound was reduced catalytically with activated nickel catalyst and hydrogen in a dilute aqueous ammonia solution and the diamine precipitated out. This diamine was separated from the liquid and washed with water. The moist diamine was then treated with an 87% solution of formic acid in isopropanol. These materials were heated together at a refluxing temperature until the reaction was complete. The resulting formyl derivative was then treated with a 2 N. aqueous solution of sodium hydroxide by heating the materials together on the steam bath for about ten minutes. During this heating the formyl derivative dissolved and then after a short time the mixture resolidified. The resulting product was theophylline. In making caffeine the mixture was cooled and treated with dimethyl sulfate and warmed to about 60° C. for a few minutes. It was then acidified with acetic acid and the caffeine immediately precipitated out. In order to purify the caffeine it was recrystallized from water and then dried. This dried caffeine was found to have a melting point of about 230° C.

Having described our invention in considerable detail it is our intention that the invention be not limited by any of the details of description unless otherwise specified, but rather be construed broadly within its spirit and scope as set out in the accompanying claims.

We claim:

1. In the preparation of a xanthine, the method which comprises: condensing cyanoacetic acid and a urea to form a cyanoacetyl-urea; transforming said cyanoacetyl-urea compound in the presence of an alkali metal nitrite and then a reducing agent into a 2,6-dioxy-4,5-diaminopyrimidine; and treating said pyrimidine derivative with a formic acid compound to form and close an imidazole ring connecting the carbon atoms in the 4 and 5 positions, said carbon atoms being joined by a double bond.

2. In the preparation of a xanthine, the method which comprises: condensing cyanoacetic acid and a urea in the presence of acetic anhydride to form a cyanoacetyl-urea; reacting said cyanoacetyl-urea compound with an alkali metal nitrite in an acid solution to form a 4-imino-violuric acid; reducing said violuric acid compound by means of catalytic reduction to a 2,6-dioxy-4,5-diaminopyrimidine; and treating said pyrimidine derivative in an aqueous alcohol solution and then with an alkali metal hydroxide to form and close an imidazole ring connecting the carbon atoms in the 4 and 5 positions, said carbon atoms being joined by a double bond.

3. In the preparation of a methylated xanthine, the method which comprises: reacting a methylated cyanoacetyl-urea in which not more than one methyl group is attached to a single nitrogen atom of the urea portion of the molecule with an alkali metal nitrite and then a reducing agent to form a methylated 2,6-dioxy-4,5-diaminopyrimidine; and treating said pyrimidine derivative with formic acid and then with an alkali metal hydroxide to form and close an imidazole ring connecting the carbon atoms in the 4 and 5 positions, said carbon atoms being joined by a double bond.

4. In the preparation of a methylated xanthine, the method which comprises: reacting a methylated 2,6-dioxy-4,5-diaminopyrimidine in which not more than one methyl group is attached to each nitrogen atom at the 1,3 position with formic acid and then with an alkali metal hydroxide to form and close an imidazole ring connecting the carbon atoms in the 4 and 5 positions, said carbon atoms being joined by a double bond.

5. In the preparation of caffeine, the method which comprises: condensing cyanoacetic acid and methyl urea having not more than two methyl groups with not more than one methyl group attached to a single nitrogen atom to form a methylated cyanoacetyl-urea; transforming said cyanoacetyl-urea in the presence of an alkali metal nitrite and then a reducing agent into a methylated 2,6-dioxy-4,5-diaminopyrimidine; treating said pyrimidine derivative with formic acid and then with an alkali metal hydroxide to form and close an imidazole ring connecting the carbon atoms in the 4 and 5 positions, said carbon atoms being joined by a double bond; and reacting with a methylating agent to introduce a methyl group at the nitrogen atom in the 7 position and a methyl group at one of the nitrogen atoms in the 1,3 position when said one nitrogen atom is not already attached to a methyl group to form caffeine.

6. In the preparation of caffeine, the method which comprises: condensing cyanoacetic acid and symmetrical dimethylurea to form cyanoacetyl-dimethylurea; transforming said cyanoacetyl-urea in the presence of an alkali metal nitrite and then a reducing agent into 1,3-dimethyl-2,6-dioxy-4,5-diaminopyrimidine; treating said pyrimidine derivative with formic acid and an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

7. In the preparation of caffeine, the method which comprises: condensing cyanoacetic acid and symmetrical dimethylurea to form cyanoacetyl-dimenthylurea; reacting said cyanoacetyl-urea with an alkali metal nitrite in an acid solution to form 1,3-dimethyl-4-imino-violuric acid; reducing said violuric acid derivative to 1,3-dimethyl-2,6-dioxy-4,5-diaminopyrimidine; treating said pyrimidine derivative with formic acid to form and close an imidazole ring connecting the carbon atoms in the 4 and 5 positions, said carbon atoms being joined by a double bond; and reacting with a methylating agent to introduce a methyl group at the 7-nitrogen atom to form caffeine.

8. In the preparation of caffeine, the method which comprises: condensing cyanoacetic acid and symmetrical dimethylurea to form cyanoacetyl-dimethylurea; transforming said cyanoacetyl-urea in the presence of an alkali metal nitrite and then a reducing agent into 1,3-dimethyl-2,6-dioxy-4,5-diaminopyrimidine; treating said pyrimidine derivative with formic acid in an aqueous alcohol solution and then with an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

9. In the preparation of caffeine, the method which comprises: condensing cyanoacetic acid and symmetrical dimethylurea in the presence of acetic anhydride to form cyanoacetyl-dimethylurea; reacting said cyanoacetyl-dimethylurea with an alkali metal nitrite in an acid solution to form 1,3-dimethyl-4-imino-violuric acid; reducing said violuric acid derivative to 1,3-dimethyl-2,6-dioxy-4,5-diaminopyrimidine; treating said pyrimidine derivative with formic acid in an aqueous alcohol solution and then with an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

10. In the preparation of caffeine, the method which comprises: condensing equimolar quantities of cyanoacetic acid and symmetrical dimethylurea in the presence of acetic anhydride at from about 95 to 125° C. to form cyanoacetyl-dimethylurea; reacting said cyanoacetyl-dimethylurea with aqueous sodium nitrite in an acid solution to form 1,3-dimethyl-4-imino-violuric acid; reducing said violuric acid derivative to form 1,3-dimethyl-2,6-dioxy-4,5-diaminopyrimidine; treating said pyrimidine derivative with formic acid in an aqueous alcohol solution and then with an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

11. In the preparation of caffeine, the method which comprises: condensing equimolar quantities of cyanoacetic acid and symmetrical dimethylurea in the presence of acetic anhydride at from about 95 to 125° C. to form cyanoacetyl-dimethylurea; reacting said cyanoacetyl-dimethylurea with aqueous sodium nitrite in an acid solution to form 1,3-dimethyl-4-imino-violuric acid; catalytically reducing said violuric acid derivative by treatment with activated nickel and hydrogen to form 1,3-dimethyl-2,6-dioxy-4,5-diaminopyrimidine; treating said pyrimidine derivative with formic acid in an aqueous alcohol solution and then with an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

12. In the preparation of caffeine, the method which comprises: reacting a methylated cyanoacetyl-urea in which not more than one methyl group is attached to a single nitrogen atom of the urea portion of the molecule with an alkali metal nitrite and then a reducing agent to form a methylated 2,6-dioxy-4,5-diaminopyrimidine; treating said pyrimidine derivative with formic acid and then with an alkali metal hydroxide to form and close an imidazole ring connecting the carbon atoms in the 4 and 5 positions, said carbon atoms being joined by a double bond; and reacting with a methylating agent to introduce a methyl group at the nitrogen atoms in the 1,3 position when said one nitrogen atom is not already attached to a methyl group to form caffeine.

13. In the preparation of caffeine, the method which comprises: reacting cyanoacetyl dimethylurea with aqueous sodium nitrite in an acid solution to form 1,3-dimethyl-4-imino-violuric acid; reducing said violuric acid derivative to form 1,3-dimethyl-2,6-dioxy-4,5-diaminopyrimidine; treating said pyrimidine derivative with formic acid in an aqueous alcohol solution and then with an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

14. In the preparation of caffeine, the method which comprises: reacting a methylated 2,6-dioxy-4,5-diaminopyrimidine in which not more than one methyl group is attached to each nitrogen atom at the 1,3 position with formic acid and then with an alkali metal hydroxide to form and close an imidazole ring connecting the carbon atoms in the 4 and 5 positions, said carbon atoms being joined by a double bond; and reacting with a methylating agent to introduce a methyl group at the nitrogen atom in the 7 position and a methyl group at one of the nitrogen atoms in the 1,3 position when said one nitrogen atom is not already attached to a methyl group to form caffeine.

15. In the preparation of caffeine, the method which comprises: reacting 1,3-dimethyl-2,6-dioxy-4,5-diaminopyrimidine with formic acid in an aqueous alcohol solution and then with an alkali metal hydroxide to form and close an imidazole ring connecting the carbon atoms in the 4 and 5 positions, said carbon atoms being joined by a double bond; and reacting with a methylating agent to introduce a methyl group at the 7-nitrogen atom to form caffeine.

16. In the preparation of a methylated xanthine, the method which comprises: condensing cyanoacetic acid and a methyl urea having not more than two methyl groups with not more than one methyl group attached to a single nitrogen atom to form a methylated cyanoacetyl-urea; transforming said cyanoacetyl-urea in the presence of an alkali metal nitrite and then a reducing agent into a methylated 2,6-dioxy-4,5-diaminopyrimidine; and treating said pyrimidine derivative with formic acid and then with an alkali metal hydroxide to form and close an imidazole ring connecting the carbon atoms in the 4 and 5 positions, said carbon atoms being joined by a double bond.

17. In the preparation of theophylline, the method which comprises: condensing equimolar quantities of cyanoacetic acid and symmetrical dimethylurea in the presence of acetic anhydride at from about 95 to 125° C. to form cyanoacetyl-dimethylurea; reacting said cyanoacetyl-dimethylurea with aqueous sodium nitrite in an acid solution to form 1,3-dimethyl-4-iminovioluric acid; reducing said violuric acid derivative to 1,3-dimethyl-2,6-dioxy-4,5-diaminopyrimidine; and treating said pyrimidine derivative with formic acid in an aqueous alcohol solution and then with an alkali metal hydroxide to form and close an imidazole ring connecting the carbon atoms in the 4 and 5 positions, said carbon atoms being joined by a double bond.

KENNETH N. CAMPBELL.
BARBARA K. CAMPBELL.

REFERENCES CITED

The following references are of record in the file of this patent:

Traube-Ber. Deut. Chem., 33, 3038–3043, (1900).

Richter: Textbook of Organic Chemistry; John Wiley and Sons, N. Y., 1938 edition, page 204.

Fiat Final Report No. 885; "Manufacture of Synthetic Caffeine," Aug. 23, 1946.

Disclaimer 2,523,496.—*Kenneth N. Campbell* and *Barbara K. Campbell*, South Bend, Ind. METHOD OF PREPARING XANTHINE AND METHYLATED XANTHINES. Patent dated Sept. 26, 1950. Disclaimer filed Feb. 7, 1951, by the inventors; the assignee, *Ivano, Inc.*, assenting and joining in.

Hereby enters this disclaimer to claim 4 of said patent.

[*Official Gazette April 10, 1951.*]